(12) United States Patent
Schustek et al.

(10) Patent No.: US 12,066,652 B2
(45) Date of Patent: *Aug. 20, 2024

(54) FUNCTION DISPLAY FOR SELECTIVELY DISPLAYING SEVERAL SYMBOLS THAT RESPECTIVELY REPRESENT A SWITCHING FUNCTION AND/OR SEVERAL SWITCHING STATES, WITH AN ALIGNMENT FUNCTION OF THE LIGHT SOURCES, AND ASSOCIATED ASSEMBLY METHOD

(71) Applicant: Preh GmbH, Bad Neustadt a.d. Saale (DE)

(72) Inventors: Wolfgang Schustek, Eichenhausen (DE); Michael Benkert, Saal an der Saale (DE)

(73) Assignee: Preh GmbH, Bad Neustadt a.d. Saale (DE)

( * ) Notice: Subject to any disclaimer, the term of this patent is extended or adjusted under 35 U.S.C. 154(b) by 31 days.

This patent is subject to a terminal disclaimer.

(21) Appl. No.: 17/807,042

(22) Filed: Jun. 15, 2022

(65) Prior Publication Data
US 2022/0404542 A1    Dec. 22, 2022

(51) Int. Cl.
*F21V 8/00* (2006.01)
*G06F 3/041* (2006.01)
*G06F 3/044* (2006.01)

(52) U.S. Cl.
CPC ......... *G02B 6/0076* (2013.01); *G02B 6/0021* (2013.01); *G02B 6/0043* (2013.01);
(Continued)

(58) Field of Classification Search
CPC .. G02B 6/0076; G02B 6/0021; G02B 6/0043; G02B 6/0065; G02B 6/0068; G02B 6/0073; G02B 6/0083; G02B 6/0088
See application file for complete search history.

(56) References Cited

U.S. PATENT DOCUMENTS

| 4,016,534 A | 4/1977 | Kobayashi et al. |
| 2004/0114344 A1 | 6/2004 | Burtsev et al. |

(Continued)

FOREIGN PATENT DOCUMENTS

| DE | 2536700 A1 | 4/1976 |
| EP | 2009615 A1 | 12/2008 |
| WO | 2005022491 A1 | 3/2005 |

OTHER PUBLICATIONS

"European Search Report for 22173798.4" dated Nov. 15, 2022. From European Patent Office; Munich, Germany.

(Continued)

*Primary Examiner* — Mary Ellen Bowman
(74) *Attorney, Agent, or Firm* — M&B IP Analysts, LLC

(57) ABSTRACT

The present disclosure relates to a function display for selectively displaying several symbols representing one switching function, respectively, and/or at least two switching states, including a light guide stack which forms a display surface facing towards an observer; wherein the light guide stack is formed from at least planar light guides arranged in an overlaid manner in a stacking direction, which are arranged so as to be spaced apart by a transparent or translucent layer; at least one light source per light guide wherein, further, at least one microstructured symbol area in or on the light guide which is configured, if the light source is activated, to be visible to the observer; a circuit board on which the several light sources are arranged and fixed; a panel fixed to the light guide stack to which the circuit board is fixed while resting against a mounting surface.

17 Claims, 5 Drawing Sheets

Figure 1:
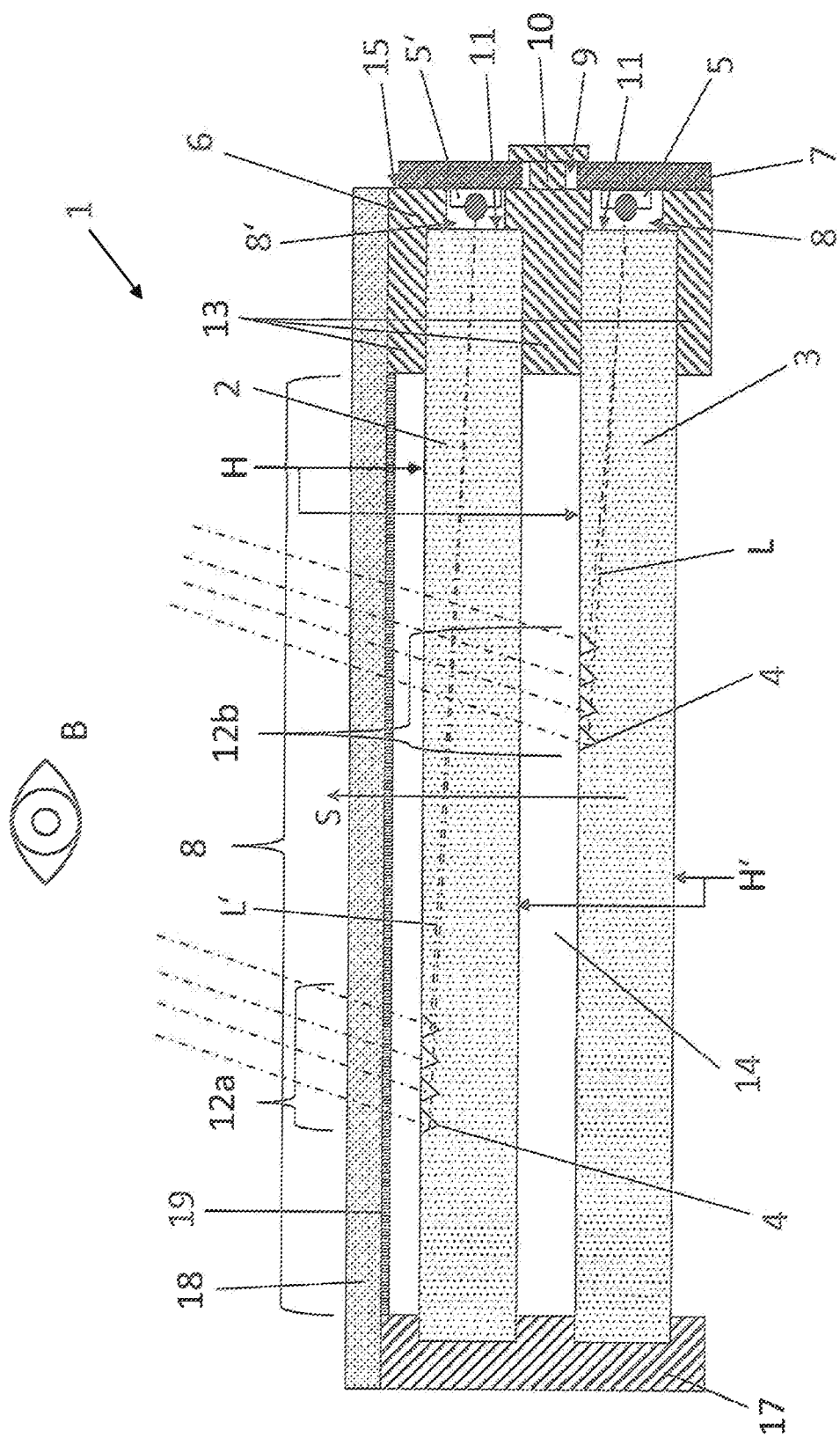

(52) U.S. Cl.
CPC ......... *G02B 6/0065* (2013.01); *G02B 6/0068* (2013.01); *G02B 6/0073* (2013.01); *G02B 6/0083* (2013.01); *G02B 6/0088* (2013.01); *G06F 3/0412* (2013.01); *G06F 3/044* (2013.01)

(56) References Cited

U.S. PATENT DOCUMENTS

| | | |
|---|---|---|
| 2008/0247152 A1 | 10/2008 | Chen |
| 2009/0073721 A1 | 3/2009 | Kamikatano et al. |
| 2009/0219734 A1 | 9/2009 | Sawada et al. |
| 2010/0124074 A1 | 5/2010 | Brychell |
| 2013/0176749 A1 | 7/2013 | Chen |
| 2021/0063632 A1 | 3/2021 | Ho et al. |
| 2023/0194767 A1* | 6/2023 | Loeppen ................. G09F 13/18 362/606 |

OTHER PUBLICATIONS

EP Office Action. European Patent Office, dated Jun. 18, 2021. Translated and Un-Translated.

* cited by examiner

FUNCTION DISPLAY FOR SELECTIVELY DISPLAYING SEVERAL SYMBOLS THAT RESPECTIVELY REPRESENT A SWITCHING FUNCTION AND/OR SEVERAL SWITCHING STATES, WITH AN ALIGNMENT FUNCTION OF THE LIGHT SOURCES, AND ASSOCIATED ASSEMBLY METHOD

The present disclosure relates to a function display for selectively displaying several symbols that respectively represent a switching function and/or several switching states, and an associated assembly method. For example, these function displays are desired in a multi-functional control member for the visualization of the switching functionalities and/or switching states connected with the control member. Generally, electronic pixel matrix displays are used for this purpose. However, they are comparatively expensive and, due to their mostly rectangular shape, limit design and placement. Moreover, electronic pixel matrix display frequently tend to "burn-in" when depicting static display contents, i.e. the display contents remain permanently and unwantedly visible even when the display is turned off, due to visually perceptible damage to the imaging layers. Moreover, the power consumption of such electronic pixel matrix displays is comparatively high. In the case of certain applications, the use of conventional electronic pixel matrix displays is precluded due to the risk of injury, e.g. in the case of a head impact. As an alternative for pixel matrix displays, it is known to couple out, in a targeted manner, the light of a light source, which is coupled into an end face of a planar light guide, at a main surface serving as a display surface by means of surface structures, wherein the area provided with surface structures is provided only in some portions and represents a symbol or the like. In order to thus be able to independently display different symbols, several of these light guides are arranged in a stacked manner, overlying one another, wherein the planar light guides are designed to be comparatively thin and configured, for example, as plastic films in order to save construction space. Thus, the precise alignment of the light-emitting diodes, which are generally used as light sources, specifically their emission pattern relative to the end faces, constitutes a problem, particularly if the light sources cannot be mounted individually on every light guide for reasons of efficiency, but are arranged on a circuit board together. A displacement of only a single light source may thus result in a low luminosity of the associated symbol or even its complete failure.

Against this background, it is the object of the present disclosure to provide a function display that provides the possibility of ensuring a reliable, precise and, at the same time, reproducible optical coupling between the light sources associated with the function display and the several light guides also associated with the function display, wherein, moreover, it is inexpensive to produce, is power-saving and reliable and/or reduces the risk of injury, particularly in the case of a head impact. This object is achieved by a function display of the claim 1. A correspondingly advantageous assembly method is the subject matter of the independent claim. Advantageous embodiments are the subject matter of the respectively dependent claims. It is to be noted that the features cited individually in the patent claims can be combined in any technologically meaningful manner and present other embodiments of the present disclosure. The description, in particular in connection with the figures, additionally characterizes and specifies the present disclosure.

The present disclosure relates to a function display for selectively displaying several symbols representing one switching function, respectively, and/or at least two switching states in particular for a motor vehicle. Selectively displaying is not only understood to mean optionally displaying different symbols from a number of predefined symbols, which in the present solution is accomplished by selectively choosing and electrically energizing one or several light sources from a plurality of light sources, but also turning on and off a light source in order to selectively make a symbol appear visually to the observer by means of the activated backlighting, or to make the symbol almost disappear for the observer, if possible, by turning off the backlight.

The function display according to the present disclosure has a light guide stack which, given an attachment of the function display as intended, forms a display surface facing towards the observer. The light guide stack is formed from at least two transparent or translucent, planar light guides arranged in an overlaid manner in a stacking direction, which are arranged so as to be spaced apart by a transparent or translucent layer including a material that is optically thinner compared to the adjacent light guides, preferably an air gap. In this case, the light guides each have a main surface facing towards the observer and a main surface facing away from the observer. In at least one light guide, the main surface facing away from the observer faces towards a light guide which is most closely adjacent in the opposite direction to the stacking direction. For example, the spacing set by means of the layer or air gap between the light guides is in the range of 1 mm to 3 mm, at least in the major part of the light guides.

Optionally, the function display according to the present disclosure may have an outer transparent or translucent cover layer, which is arranged between the light guide stack and the observer and through which the display surface defined by the light guide stack is visible to the observer given an arrangement of the function unit as intended. For example, the material or materials of the cover layer and of the light guides is a plastic, preferably a thermoplastic material, such as polyethylene (PE), polycarbonate (PC), polystyrene (PS), polyvinyl chloride (PVC), polyamide (PA), acrylonitrile butadiene styrene (ABS) or polymethyl methacrylate (PMMA), or a glass material.

According to the present disclosure, at least one light source per light guide is provided, which is arranged for coupling light, via an end face of the associated light guide, into the respective light guide. For example, the light guides have two opposing main surfaces, which preferably extend parallel to each other and which are connected to each other via end faces, which form common edges with the main surfaces of the light guide, e.g. at the narrow sides and at the long sides of the light guide. For example, the end faces are orthogonal to at least one main surface or both main surfaces of the light guide.

For example, the light source is a light-emitting diode, preferably one with an SMD design. In order to improve the coupling-in of light and/or to adapt the light emission characteristics of the light source to the end face intended for the entrance of light into the light guide, a lens is preferably disposed in each case between the light guide and the light source.

According to the present disclosure, one microstructured symbol area per light guide is provided in or on the light guide, which includes several light-refractive and/or light-scattering microstructures. Acting on its own or in combination with other microstructured symbol areas of the same light guide or of another light guide, the microstructured symbol area forms a symbol which, if the light source is activated, becomes visible to the observer, illuminated by the light coupled into the respective light guide or light guides, due to a light refraction and/or light scattering caused by the several microstructures at the respective microstructure surface. For example, an angle of incidence of the light on the associated main surface is achieved by means of the microstructure, which does not meet the conditions for total reflection of the main surface of the light guide as an interface, so that the light coupled into the light guide leaves the light guide again.

According to the present disclosure, a circuit board is provided, on which the several light sources are arranged and fixed. Preferably, this fixation is effected by soldering them to a metallic contact pad of the circuit board. According to the present disclosure, a panel fixed to the light guide stack by substance-to-substance connection and/or non-positively and/or positively is also provided. This panel, which, according to the present disclosure, forms a mounting surface to which the circuit board is fixed so as to rest thereon, is preferably formed from an opaque material. According to the present disclosure, the panel has several light shafts that are open on both sides and respectively accommodate at least one of the light sources of the circuit board, so that at least one light source is situated opposite an end face in order to couple light into the respectively associated end face, preferably in order to ensure, if possible, the exclusive light transition from the light source to the associated light guide, which, due to the arrangement of its end face opposite to the respective light source, is associated therewith. Consequently, the light shafts are preferably configured in such a way that an unwanted light transition towards the observer, towards other layers or light guides next to the associated light guide is suppressed.

According to the present disclosure, the first clearance, which is present in the stacking direction, between two light shafts spaced apart transversely to the stacking direction and the associated light source accommodated in the respective light shaft is smaller than each second clearance, which is present in the stacking direction, between the remaining light shafts and the associated light source accommodated in the respective light shaft. For example, the first clearance is 0.05 to 0.20 mm, whereas the second clearance is 0.5 mm to 5 mm. The first or second clearances are understood to denote the clear overall distance between the light source and the light shaft in the stacking direction, to which the movability of the respective light source in the light shaft associated therewith is limited in the stacking direction. Thus, two light sources spaced apart transversely to the stacking direction, in cooperation with the light shaft respectively associated therewith, serve for the mechanical alignment between the panel and the circuit board, while the remaining light sources remain unaffected thereby due to the greater clearance. Due to the danger of damage to the light sources or their electrical contacting, such as the loss of the soldered contact or a detachment of the contact pad of the circuit board by shearing forces, particularly in the case of the light source being configured as light-emitting diodes with an SMD design, such a mechanical intervention was generally omitted in the known solutions, with the drawback that a misalignment of the light sources had to be tolerated. Tolerating the danger of damage to two light sources at most, the present embodiment uses them as a mechanical positioning aid or alignment aid for the connection between the circuit board and the panel, with the advantage that a sufficiently precise alignment of all light sources with the associated end faces, and thus an optimal illumination of the associated light guide, is now ensured, because, in particular, the light sources can be positioned on the circuit board with a sufficient and considerably higher positioning accuracy than is the case, for example, in automatic mounting machines in SMD mounting.

In order to strengthen, for example, the mechanical connection to the circuit board of the two light sources provided for mechanical alignment, hereinafter referred to as alignment light sources, various measures may be taken, for example, e.g. an enlarged contact pad on the circuit board, a solder that is more mechanically durable, a different alignment of the alignment light source, e.g. compared to the remaining light sources of the circuit board. In another embodiment, a further light source, which does not act as an alignment light source, may be assigned as a redundant light source to the light guide associated with the alignment light source.

Preferably, the two alignment light sources are assigned to one and the same light guide in order to ensure a precise alignment with regard to the respective light guide and thus the uniform illumination thereof, because with the latter, a symbol is visually displayed which is essential to the function in the use of the function display, such as a warning symbol that is essential during driving when the function display is used in an automotive engineering context.

The microstructured symbol area can be incorporated into the light guide by laser ablation, e.g. three-dimensionally by vitrography, which is also referred to as internal laser engraving, or be applied to one of its main surfaces. Preferably, the microstructured symbol area is formed by embossing one of the main surfaces per light guide, whereby the function display can be realized in a cost-effective manner.

Preferably, the microstructured symbol area is formed of several microstructures configured with an identical shape, which together respectively form a contiguous microstructured symbol area for each light guide. Preferably, a microstructure is understood to be a singular raised portion on the main surface or a singular depression in the main surface. In order to largely preclude naked-eye visibility, a maximum dimension of each microstructure is in this case in the range from 1 to 50 µm, preferably in the range from 1 µm to 25 µm. Preferably, the microstructures are distributed across the entire microstructured symbol area in a uniformly spaced manner. For example, the microstructures are formed in a pyramid or prismatic shape. Preferably, the microstructures are formed not only with identical shapes, i.e. in a matching manner, but have a matching alignment within the respective microstructured symbol area. In the case of a plane main surface, for example, a matching alignment results if each microstructure can be mapped to an adjacent microstructure of the same microstructured symbol area by an imaginary displacement that is exclusively translational. More preferably, the microstructures are configured such that they generate, from the light that originates from the light source and has previously entered the light guide via the end face, a collimated light beam exiting the light guide.

Preferably, the mean number density of the microstructures for each microstructured symbol area of the light guide stack is in the range from 500 to 7,000 per $mm^2$, more preferably in the range from 1000 to 4000 per $mm^2$. On the one hand, this ensures the non-visibility if the light source is turned off, while the impression of a seemingly uniformly illuminated symbol area can be simulated to the "naked eye". Preferably, the mean number density is selected to be substantially the same for each light guide, wherein "substantially the same" means a maximum deviation between the number densities of the light guides of less than 100 per mm².

Preferably, all light guides outside the microstructured symbol area are transparent, so that a large part of the function display remains at least partially transparent and, for example, the possibility of looking through the function display is ensured in order to provide the observer with the possibility of following other displays, instruments or the course of the road through the function display. For example, placing the function display on a steering wheel is possible, e.g. in the area between the steering wheel hub and the steering wheel rim, without impeding the view onto the dashboard. Preferably, the surface proportion of all surface-structured symbol areas is less than half of the display surface.

Preferably, at least one of the light guide, more preferably all of the light guides of the light guide stack, includes a plastic film, e.g. a thermoplastic film, such as a PC film or PE film. The respective light guide is not absolutely required to have a one-piece configuration; it may be composed of several components. In one configuration, at least one light guide has a multi-layered film layer structure. For example, at least one light guide is produced by back-molding a transparent film with another transparent or translucent material, in particular a thermoplastic material.

According to a preferred embodiment, it is provided that, given a vertical view onto the display surface, particularly from a position above the geometric center of the display surface, the microstructured symbol areas of at least two light guides of the light guide stack, to the observer, do not overlap, and are preferably spaced apart.

According to a preferred embodiment, it is provided that, given a vertical view onto the display surface, particularly from a position above the geometric center of the display surface, the microstructured symbol areas of at least two light guides of the light guide stack, to the observer, are adjacent, preferably overlap, more preferably are arranged congruently.

According to a preferred embodiment, at least two light sources differ with regard to the color of the light in order to provide additional color effects.

Preferably, the panel has a number of grooves corresponding to the number of the light guides, for the positive accommodation of, respectively, that end of the light guide that forms the end face facing towards the light source. A reliable positioning of the end faces is achieved thereby. The web-shaped projections or ribs formed between the grooves serve for the optical insulation between the light guides.

According to a preferred embodiment, for fixing the circuit board to the panel, the circuit board has a recess or through-hole, and the panel has a pin, which extends through the recess or through-hole, which protrudes from the mounting surface, and whose free end is heat-staked. For example, the pin and the panel are formed integrally from a thermoplastic material.

Preferably, and in particular in order to avoid the risk of mutual light crosstalk in the adjacent light guides, at least the outer light guides of the light guide stack each have a cranked portion at the end that forms the end face facing towards the light source. Preferably, the cranked portion is formed so as to increase the distance between the light guides with respect to the region of the light guides in which the microstructured symbol area is arranged, in order to improve the fixation of the light guides and improve the mutual optical insulation due to the panel.

According to a preferred embodiment, a transparent electrode array disposed between the observer and the light guide stack, and an associated electronic evaluation unit for capacitive, preferably spatially resolved capacitive, touch detection are provided, in order to change the functional states displayed by the symbols through input by touch, for example.

According to a preferred embodiment, in order to save construction space, it is provided that a circuit board surface of the circuit board carrying the light sources is arranged substantially parallel to the stacking direction determined by the position of the light guides.

Preferably, the function display has a housing, wherein the circuit board is exclusively elastically supported on the housing, or is not directly supported on the housing. Preferably, the exclusively elastic support is provided substantially in a direction perpendicular to the mounting surface in order to avoid mechanical damage to the light sources.

The present disclosure further relates to an assembly method for a function display for selectively displaying symbols representing switching functions and/or switching states, in particular for a motor vehicle, comprising the following steps. In a providing step, a light guide stack is provided which, given an attachment of the function display as intended, forms a display surface facing towards the observer. In this case, the light guide stack is formed from at least two transparent or translucent, planar light guides arranged in an overlaid manner in a stacking direction, which are arranged so as to be spaced apart by a transparent or translucent layer including a material that is optically thinner compared to the adjacent light guides, preferably an air gap, so that the light guides each have a main surface facing towards the observer and a main surface facing away from the observer. In at least one light guide, the main surface facing away from the observer faces towards a light guide which is most closely adjacent in the opposite direction to the stacking direction. Further, at least one microstructured symbol area per light guide is provided in or on the light guide, which includes several light-refractive and/or light-scattering microstructures.

In another providing step, a circuit board is provided which carries several light sources, the number of which corresponds to at least the number of the light guides. Preferably, all the light sources are arranged on one of the main surfaces of the circuit board, which is referred to as the circuit board surface.

In another step of providing, a panel is provided, which has a mounting surface for the circuit board, preferably the circuit board surface, to rest against, and several light shafts that are open on both sides, wherein the light shafts are configured to accommodate in each case at least one of the light sources of the circuit board, because its one end preferably ends in the mounting surface.

For example, the step of providing provides that the light guides and the panel are produced in a molding process, particularly a thermal molding process, such as an injection-molding process. The molding process respectively used may include, for example, the structuring of the main surfaces of the light guides with the several microstructures, e.g. by embossing.

In a subsequent step, the light guide stack is fixed to the panel by substance-to-substance and/or non-positive and/or positive connection.

In an alignment step, the circuit board is aligned by the circuit board being brought to rest against the mounting surface, such that in each case at least one light source, via a light shaft of the panel, is situated opposite an end face of one of the light guides in order to couple in light, and the light sources are each accommodated in an associated light shaft. According to the present disclosure, it is provided that the first clearance, which is present in the stacking direction, between two light shafts spaced apart transversely to the stacking direction and the associated light source accommodated in the respective light shaft is smaller than each second clearance, which is present in the stacking direction, between the remaining light shafts and the associated light source accommodated in the respective light shaft, so that thus, the relative alignment of the panel and the circuit board is determined by the first clearance.

In a subsequent step, the aligned circuit board is fixed to the panel in such a way that in each case the light of the light sources, via an end face of an associated light guide facing towards the light source, is coupled into the respective light guide, and the microstructured symbol area, if the light source is respectively activated, becomes visible, illuminated by the light coupled into the light guide, to the observer, in order to display to the observer a symbol composed of one or several microstructured symbol areas. Clearance is understood to denote the clear overall distance between the light source and the light shaft accommodating the light source in the stacking direction, to which the movability of the respective light source in the light shaft associated therewith is thus limited in the stacking direction. Thus, two light sources spaced apart transversely to the stacking direction, in cooperation with the light shaft respectively associated therewith, serve for the mechanical alignment between the panel and the circuit board, while the remaining light sources remain unaffected thereby due to the greater second clearance. Due to the danger of damage to the light sources or their electrical contacting, such as the loss of the soldered contact or a detachment of the contact pad of the circuit board by shearing forces, particularly in the case of the light source being configured as light-emitting diodes with an SMD design, such a mechanical intervention was generally omitted in the known solutions, with the drawback that a misalignment of the light sources had to be tolerated. Tolerating the danger of damage to two light sources, the present embodiment uses them as a mechanical positioning aid for the connection between the circuit board and the panel, with the advantage that a sufficiently precise alignment of all light sources with the associated end faces, and thus an optimal illumination of the associated light guide, is now ensured.

According to a preferred embodiment of the assembly method according to the present disclosure, it is provided, for fixing the circuit board to the panel, that the panel forms a pin, which extends through a recess or through-hole of the circuit board, and which extends through the recess or the through-hole with a third clearance present in the stacking direction that is at least greater than the first clearance. In this case, the fixing comprises a final heat-staking of the pin in order to fix the circuit board to the panel.

According to a preferred embodiment, the light sources are light-emitting diodes configured with an SMD design, and are soldered to the circuit board in a soldering step preceding the providing of the circuit board.

Figure 2:
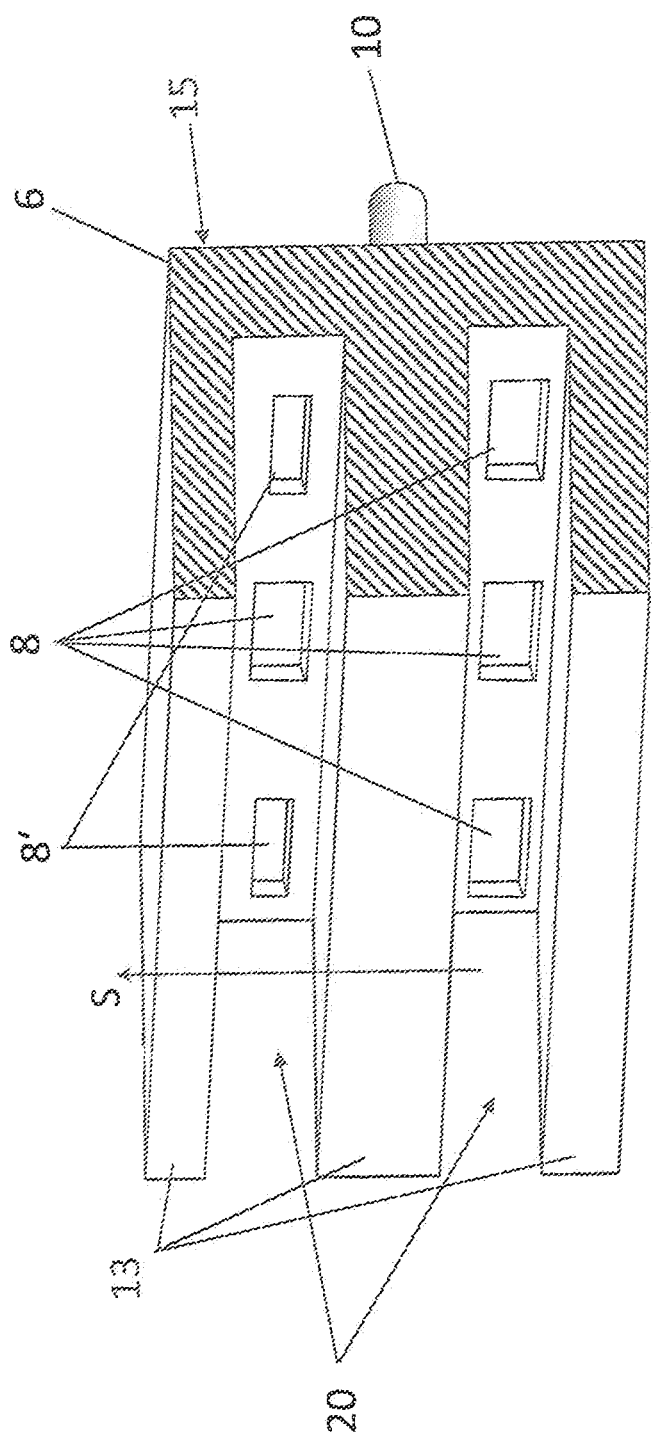
Figure 3:
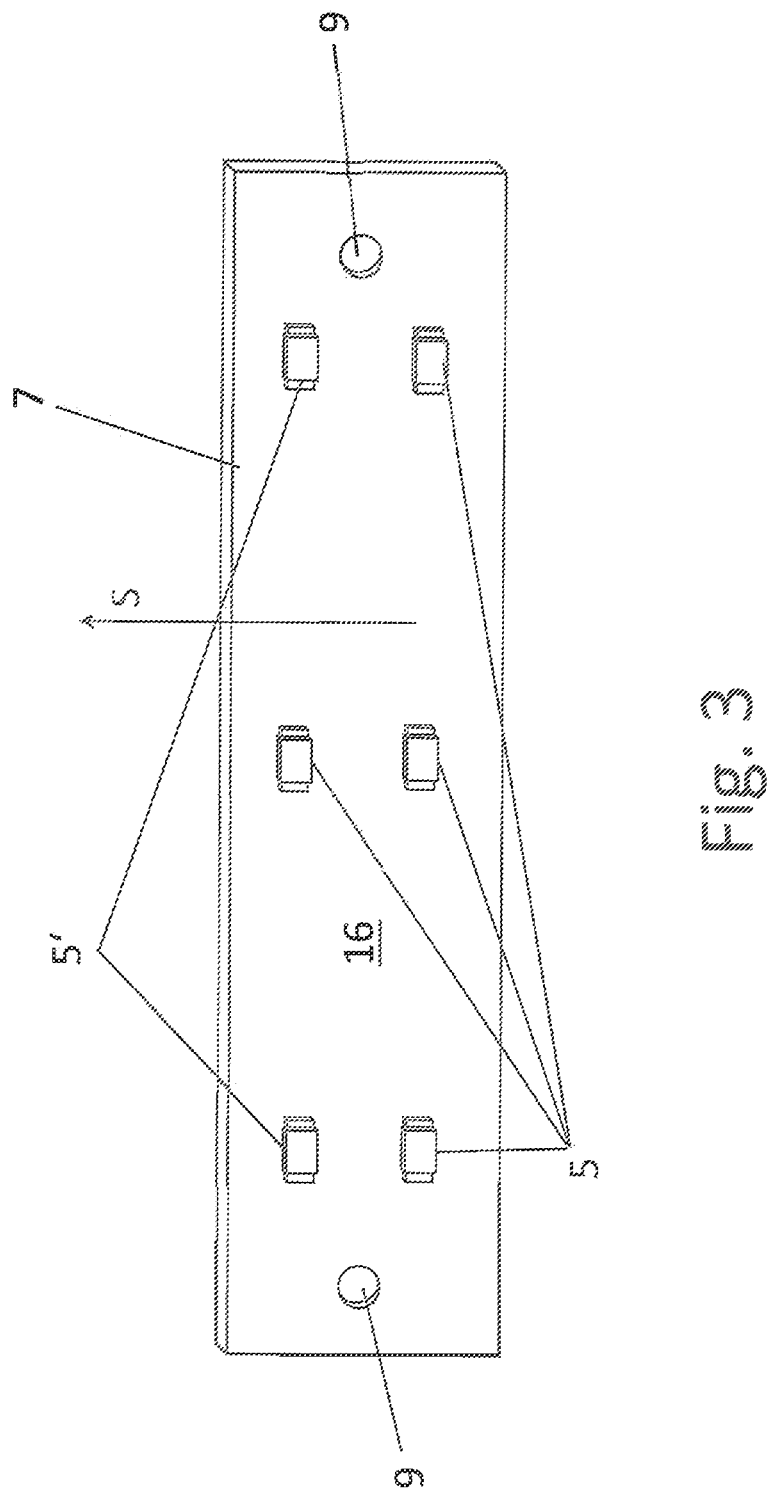
Figure 4:
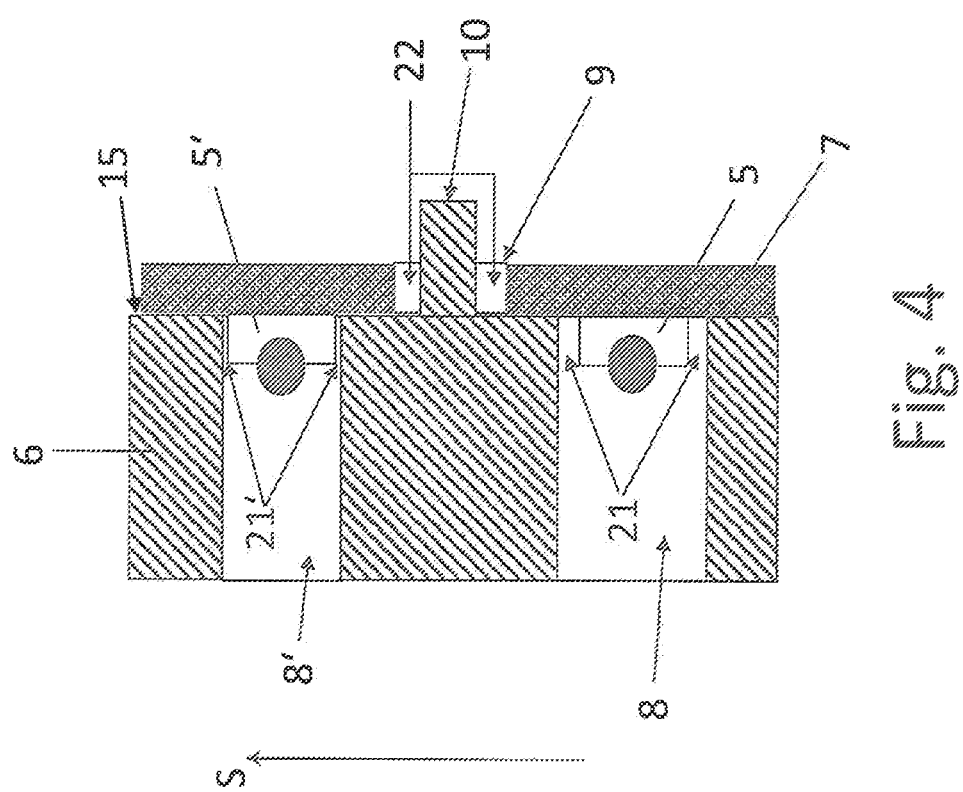
Figure 5:
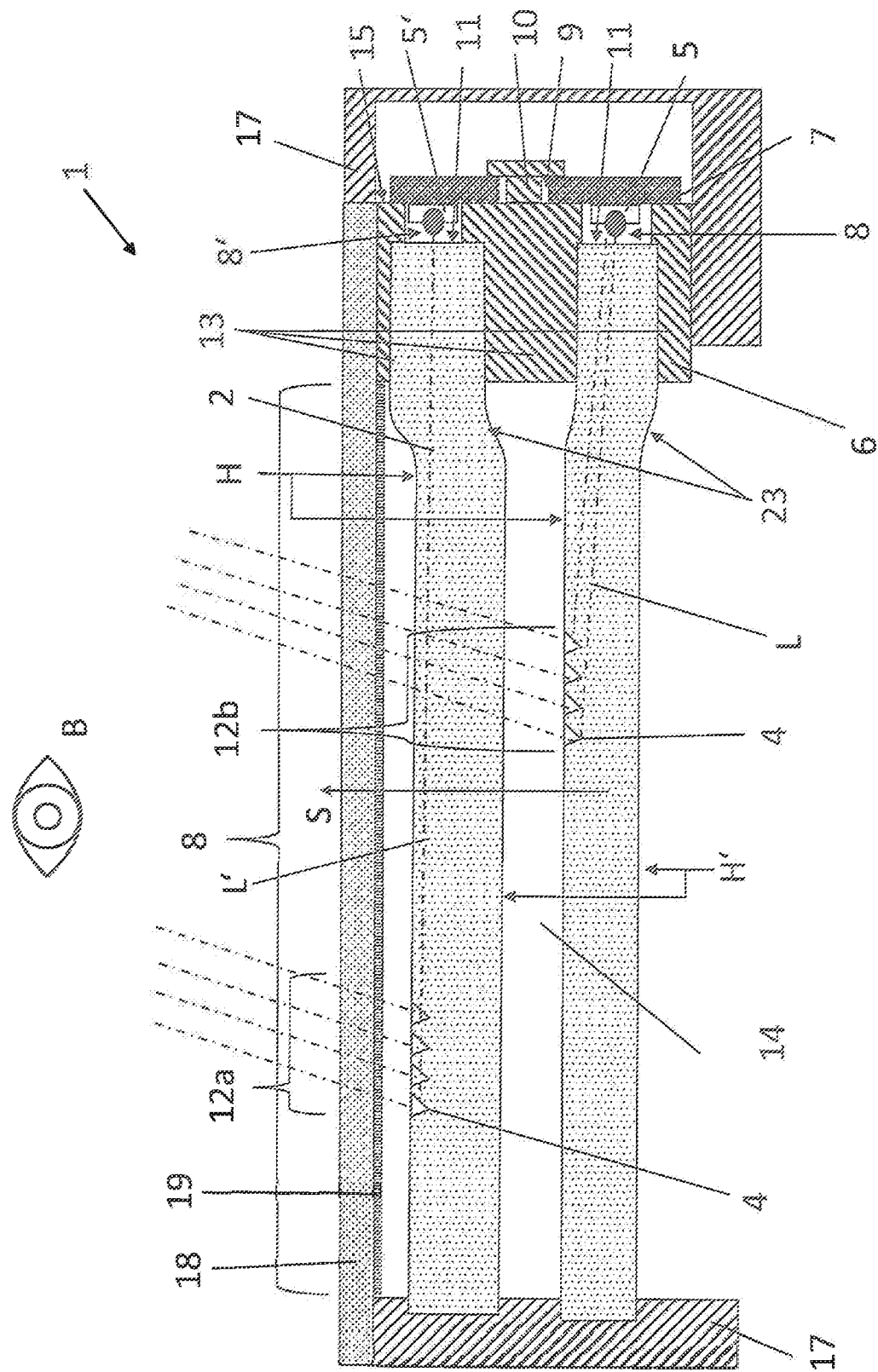

The various embodiments as well as the technical environment will be explained in more detail below with reference to the Figures. It must be remarked that the Figures depict a particularly preferred embodiment of the disclosed embodiments, but that the latter is not limited thereto. The Figures schematically show:

FIG. 1 a schematic cross-sectional view of a first embodiment of a function display 1 according to the embodiment;

FIG. 2 a perspective view of a panel 6 of the first embodiment from FIG. 1;

FIG. 3 a perspective view of a circuit board 7 of the first embodiment from FIG. 1, FIG. 4 an enlarged depiction of a part of FIG. 1;

FIG. 5 a schematic cross-sectional view of a second embodiment of the function display 1 according to the embodiment.

FIG. 1 schematically shows a first embodiment according to the embodiment of the function display 1. The function display 1 comprises an outer transparent or translucent cover layer 18, which is not absolutely required and is only optionally provided, and which, given an arrangement of the function display 1 as intended, defines a surface facing towards the observer B. For example, this is a layer including a plastic, preferably a thermoplastic material, such as polyethylene (PE), polycarbonate (PC), polystyrene (PS), polyvinyl chloride (PVC), polyamide (PA), acrylonitrile butadiene styrene (ABS) or polymethyl methacrylate (PMMA), or a glass material. The cover layer 18 may also be part of a layer structure including several layers. A transparent, conductive coating, which forms an electrode array and which serves for spatially resolved touch detection and is connected in an electrically conductive manner by means of several flexible conductors to an evaluation unit that is not shown, is applied, adjacent to the cover layer 18, to the surface of the cover layer 18 facing away from the observer B.

The function display 1 further comprises a light guide stack including at least two transparent or translucent, planar light guides 2, 3 arranged in an overlaid manner. The latter are also formed from a plastic, preferably a thermoplastic material, such as polyethylene (PE), polycarbonate (PC), polystyrene (PS), polyvinyl chloride (PVC), polyamide (PA), acrylonitrile butadiene styrene (ABS) or polymethyl methacrylate (PMMA), or a glass material. Preferably, this is a thermoplastic plastic layer or a thermoplastic plastic film in each case. The light guides 2, 3 are separated from each other by a layer 14 provided between the light guides 2, 3, in this case an air gap, including a material, in this case air, with a refractive index lower than that of the adjacent light guides 2, 3. An air layer, which is not defined herein in more detail, is also provided between the cover layer 18 and the most closely adjacent uppermost light guide 2. The light guides 2, 3 each form at least one main surface H facing towards the observer B and a main surface H' facing away from the observer B, while the upper light guide 2 that is closer to the observer B has a main surface H' which faces away from the observer and faces towards the light guide 14 which is most closely adjacent in the opposite direction to the stacking direction S.

At least one light source 5 or 5', i.e. a light-emitting diode with an SMD design in each case, which are arranged in such a way that the light produced by them is coupled into the assigned light guide 2, 3 via an end face 11 situated towards the side with regard to the stacking direction S, is assigned to the light guides 2, 3. In order to avoid, among other things, unwanted light scattering or light emission into the adjacent light guides 2, 3 in each case, a panel 6 including an opaque material, particularly of an opaque thermoplastic material, is provided. The panel 6 forms protruding ribs 13 which are positively accommodated and fixed between the grooves for accommodating the light guides 2, 3, specifically the ends thereof with the end faces 11 provided for coupling in light.

A frame-shaped housing 17 is provided at the opposite end face. A reflection-reducing coating, which is not shown, can be applied to the end faces of the light guides 2, 3 facing away from the light sources 5, 5' in order to minimize a reflection back into the respective light guide 2, 3. Several singular microstructures 4 are incorporated by embossing or molding into at least one of the main surfaces of the light guide 2, in this case into the main surface H facing towards the observer B, which ensure that the light L' coupled into the light guide 2 is coupled out from the respective light guide 2 by light refraction and/or light scattering and define a microstructured symbol area 12a comprising the microstructures 4. On its own or by optical cooperation with other symbol areas, the latter reproduces the shape of a symbol which becomes visible to the observer B in an illuminated manner if the associated light source 5' is activated accordingly.

The microstructures 4 are configured so as to be shaped identically to one another and have a maximum diameter in the range from 1 to 25 μm. The light guide 3 distant from the observer B, in its main surface H facing towards the observer B, also has microstructures 4 that are also configured to be singular and shaped identically to one another. They are also incorporated into the associated main surface H of the light guide 3, which in this case faces towards the observer B, by embossing or molding. They also couple the light L coupled into the light guide 3 in the direction of the observer B in order to visualize the symbol area 12b to the observer in this case.

By selectively activating the light sources 5, 5', different switching states or switching functions can be visualized in a comparatively simple manner. The function display 1 is simple and cost-effective to realize and provides the designer with a large degree of designing leeway, which also pertains to the placement of the function display 1. The function display exhibits almost no ageing effects caused by light emission and is comparatively energy-saving. Acting on its own or in cooperation with others, the microstructured symbol area 12, 12b, for example, represents the symbol in a positive manner as an image, as the inverse representation thereof, or as its outline. A certain depth effect is the result of, among other things, the distance between the light guides 2, 3, e.g. the air gap thickness. For example, the distance is in the range of 1 to 3 mm.

Outside the microstructured symbol area 12a, 12b, all the light guides 2, 3 are transparent. Thus, a large part of the display surface 8 remains optically transmissive, so that, for example, the possibility of looking through the function display 1 is ensured in order to provide the observer B with the possibility of following other displays or the course of the road through the function display 1. For example, placing the function display 1 on a steering wheel is possible, e.g. in the area between the steering wheel hub and the steering wheel rim, without impeding the view onto the dashboard. Looking vertically at the display surface 8, the microstructured symbol areas 12a, 12b of the individual light guides 2, 3 do not overlap in order not to affect the quality of the depiction of the symbols.

A circuit board 7 is provided on which the several light sources 5, 5' are arranged and fixed. Here, they are fixed by soldering them to a metallic contact pad of the circuit board 7. The above-described panel 6 forms, on the side thereof facing away from the light guides 2, 3, a mounting surface 15 that serves for the contact of the surface of the circuit board 7 provided with the light sources 5, 5'. This surface is orientated parallel to the stacking direction S. The circuit board 7 has a through-hole 9 through which a pin 10, which is formed by the panel 6, extends and whose free end is deformed by heat staking so as to reach behind and fix the circuit board 7. The panel 6 has several light shafts 8, 8' that are open on both sides and respectively accommodate at least one of the light sources 5, 5' of the circuit board 7, so that at least one light source 5, 5' is situated in each case opposite an end face 11 in order to couple light into the respectively associated end face 11, and in order to ensure, if possible, the exclusive light transition from the light source 5, 5' to the associated light guide 2, 3, which, due to the arrangement of its end face 11 opposite to the respective light 5, 5' source, is associated therewith. Consequently, the light shafts 8, 8' are configured in such a way that an unwanted light transition towards the observer B, towards other layers or light guides 2, 3 next to the associated light guide 2, 3 is suppressed. FIG. 2 shows the panel 6 in detail with a view into the groove 20, which is formed between the ribs 13 and provided for positively accommodating and fixing the light guides 2, 3. Here, it becomes clear that the light shafts 8 and 8' differ with regard to their dimensions in the stacking direction S.

FIG. 4 shows the circuit board 7 in a top view onto the surface 16 equipped with the light sources 5, 5'. In each case, the light sources 5, 5' are identically shaped SMD light-emitting diodes soldered to the contact pads of the circuit board 7. Two light sources 5' spaced apart in a direction transverse to the stacking direction, due to a special dimensioning of the light shafts assigned to them, qualify as so-called alignment light sources, as will be explained below:

If the dimensions of all light sources 5, 5' in the stacking direction S match, this results in the scenario depicted in FIG. 3. The first clearance 21', which is present in the stacking direction S, between two light shafts 8' spaced apart transversely to the stacking direction S and the associated light source 5' accommodated in the respective light shaft 8' is smaller than the second clearance 21, which is present in the stacking direction S, between the remaining light shafts 8 and the associated light source accommodated in the respective light shaft 8. The first or second clearances 21, 21' are understood to denote the clear overall distance between the respective light source 5, 5' and the light shaft 8, 8' in the stacking direction S, to which the movability of the respective light source 5, 5' in the light shaft 8, 8' associated therewith is limited in the stacking direction S. Thus, two light sources 5' spaced apart transversely to the stacking direction S and almost positively accommodated light sources 5', in cooperation with the light shaft 8' respectively associated therewith, serve for the mechanical alignment between the panel 6 and the circuit board 7, while the circuit board 7 is brought to rest against the mounting surface 15 of the panel 6. Due to the greater second play 21, the remaining light sources 5 or light shafts 8 remain unaffected thereby. Due to the danger of damage to the light sources 5, 5' or their electrical contacting, such as the loss of the soldered contact or a detachment of the contact pad of the circuit board 7 by shearing forces, particularly in the case of the light source 5, 5' being configured as light-emitting diodes with an SMD design, such a mechanical intervention was generally omitted in the known solutions, with the drawback that a misalignment of the light sources 5, 5' had to be tolerated. Tolerating the danger of damage to at most two light sources 5', the present embodiment uses them as a mechanical positioning aid for the connection between the circuit board 7 and the panel 6, with the advantage that a sufficiently precise alignment of all light sources 5, 5' with the associated end faces 11, and thus an optimal illumination of the associated light guide 2, 3, is now ensured.

In order to strengthen, for example, the mechanical connection to the circuit board 7 of the two light sources 5' provided for mechanical alignment, previously referred to as alignment light sources, various measures may be taken, for example, e.g. an enlarged contact pad on the circuit board 7, a solder that is more mechanically durable, a different alignment of the alignment light source, e.g. compared to the remaining light sources 5 of the circuit board 7. In the embodiment shown, a further light source 5, which does not act as an alignment light source, and which thus has a greater second clearance 21 when arranged in the associated light shaft 8, may be assigned as a redundant light source to the light guide 2 associated with the alignment light source.

As FIG. 4 also shows, the pin 10 provided on the panel 6 for fixing the circuit board 7, at least prior to heat staking, extends through the through-hole 9 provided in the circuit board 7 with a third clearance 22 to be determined in the stacking direction S, which is at least greater than the first clearance 21', in order not to impede the alignment of the circuit board 7, during its placement on the mounting surface 15 and the insertion of the light sources 5, 5' into the associated light shafts prior to heat staking, by a displacement or twisting of the circuit board 7 relative to the panel 6 or the mounting surface 15 that is made possible to at least a limited extent.

FIG. 5 shows a second embodiment of the function display 1 according to the embodiment. The latter differs from the first embodiment substantially due to the shaping of the light guides 2, 3. In order to avoid the risk of mutual light crosstalk in the adjacent light guides 2, 3, at least the outer light guides 2, 3 of the light guide stack each have a cranked portion 23 at the end that forms the end face 11 facing towards the light source 5, 5'. Here, the cranked portion 23 is formed so as to increase the distance between the light guides 2, 3 in the direction of the panel 6 with respect to the region of the light guides 2, 3 in which the microstructured symbol area 12a, 12b is arranged, in order to improve the fixation of the light guides 2, 3 and improve the mutual optical insulation due to the panel 6. Moreover, in contrast to the first embodiment, the housing 17 is configured to be frame-shaped, wherein a direct contact between the housing 17 and the circuit board 7 is excluded.

What is claimed is:

1. A function display for selectively displaying several symbols representing one switching function, respectively, and/or at least two switching states, respectively, in particular for a motor vehicle, comprising:
    a light guide stack which, given an attachment of the function display, forms a display surface facing towards an observer; wherein the light guide stack is formed from at least two transparent or translucent planar light guides arranged in an overlaid manner in a stacking direction, which are arranged so as to be spaced apart by a transparent or translucent layer including a material that is optically thinner compared to the adjacent planar light guides so that the planar light guides each have a main surface facing towards the observer and a main surface facing away from the observer, and, in at least one light guide of the planar light guides, the main surface facing away from the observer faces towards another at least one light guide of the planar light guides which is most closely adjacent in the opposite direction to the stacking direction;
    at least one light source for each planar light guide, which is arranged such that in each case, its light, via an end face of an associated light guide facing towards the light source, is coupled into the respective light guide;
    wherein, further, at least one microstructured symbol area provided in or on the planar light guide is provided for each planar light guide, which includes several light-refractive and/or light-scattering microstructures and is configured, if the at least one light source is respectively activated, to be visible, illuminated by the light coupled into the planar light guide, to the observer, in order to display to the observer a symbol composed of the at least one microstructured symbol area;
    a circuit board on which the at least one light source of the planar light guides is arranged and fixed;
    a panel fixed to the light guide stack by at least one of: a substance-to-substance connection, a non-positive connection, and a positive connection, to which the circuit board is fixed while resting against a mounting surface, wherein the panel has several light shafts that are open on both sides and respectively accommodate the at least one of the light sources of the circuit board, so that the at least one light source is situated opposite the associated end face in order to couple the light into the associated end face, wherein a first clearance, which is present in the stacking direction, between two light shafts spaced apart transversely to the stacking direction and the associated light source accommodated in the respective light shaft is smaller than each second clearance, which is present in the stacking direction, between the remaining light shafts and the associated light source accommodated in the respective light shaft.

2. The function display according to claim 1, wherein the at least one light source is a light-emitting diode configured with an SMD design.

3. The function display according to claim 1, wherein the at least one microstructured symbol area has in each case several microstructures configured in an identically shaped manner.

4. The function display according to claim 1, wherein the panel has at least one groove, wherein the number of at least one groove corresponds to a number of the planar light guides, for a positive accommodation of that end of the planar light guide that forms the end face facing towards the light source.

5. The function display according to claim 1, wherein the circuit board is fixed to the panel, wherein the panel forms a pin, which extends through a recess or through-hole of the circuit board and whose free end is heat-staked.

6. The function display according to claim 1, wherein at least the outer light guides of the light guide stack each have a cranked portion at the end that forms the end face facing towards the light source.

7. The function display according to claim 1, further comprising a cover layer including a transparent material, which is disposed between the light guide stack and the observer.

8. The function display according to claim 1, further comprising a transparent electrode array disposed between the observer and the light guide stack, and an associated electronic evaluation unit for capacitive touch detection.

9. The function display according to claim 1, wherein the circuit board has a circuit board surface carrying the at least one light source and the stacking direction is parallel to the circuit board surface.

10. The function display according to claim 1, further comprising a housing, wherein the circuit board is supported, not in a direct manner, or exclusively elastically, on the housing.

11. An assembly method for a function display for selectively displaying symbols representing switching functions and/or switching states, in particular for a motor vehicle, comprising the following steps:

providing a light guide stack which, given an attachment of the function display forms a display surface facing towards an observer; wherein the light guide stack is formed from at least two transparent or translucent planar light guides arranged in an overlaid manner in a stacking direction, which are arranged so as to be spaced apart by a transparent or translucent layer including a material that is optically thinner compared to the adjacent light guides, so that the planar light guides each have a main surface facing towards the observer and a main surface facing away from the observer, and, in at least one light guide of the planar light guides, the main surface facing away from the observer faces towards another at least one light guide of the planar light guides which is most closely adjacent in the opposite direction to the stacking direction, and wherein, further, at least one microstructured symbol area provided in or on the planar light guide is provided for each light guide, which includes several light-refractive and/or light-scattering microstructures;

providing a circuit board with a number of several light sources arranged on the circuit board that corresponds to at least the number of the planar light guides;

providing a panel which has a mounting surface for the circuit board to rest against, and several light shafts that are open on both sides, wherein the several light shafts are configured to accommodate in each case at least one of the several light sources of the circuit board;

fixing the light guide stack to the panel by at least one of: a substance-to-substance, a non-positive, and a positive connection;

aligning the circuit board while it rests against the mounting surface, such that in each case at least one light source of the several light sources is situated opposite an end face of one of the planar light guides in order to couple in a light through one of the several light shafts, and the several light sources are each accommodated in one of the several light shafts; and wherein a first clearance, which is present in the stacking direction, between two of the several light shafts spaced apart transversely to the stacking direction and an associated light source accommodated in the respective light shaft is smaller than each second clearance, which is present in the stacking direction, between remaining light shafts and a remaining associated light source accommodated in the respective light shaft;

fixing the circuit board to the panel in such a way that in each case the light of the several light sources, via an end face of an associated light guide facing towards the light source, is coupled into the respective light guide, and the microstructured symbol area, if the light source is respectively activated, becomes visible, illuminated by the light coupled into the associated light guide, to the observer, in order to display to the observer a symbol composed of one or several microstructured symbol areas.

12. The assembly method according to claim 11, wherein the circuit board is fixed to the panel, wherein the panel forms a pin, which extends through a recess or through-hole of the circuit board, and which extends through the recess or the through-hole with a third clearance present in the stacking direction that is at least greater than the first clearance; and the fixing comprises a final heat-staking of the pin in order to fix the circuit board to the panel.

13. The assembly method according to claim 11, wherein the light sources are light-emitting diodes configured with an SMD design, and are soldered to the circuit board in a soldering step preceding the providing of the circuit board.

14. The function display according to claim 1, wherein the planar light guides are spaced apart in an air gap.

15. The function display according to claim 3, wherein the several microstructures are singular microstructures.

16. The function display according to claim 8, wherein the associated electronic evaluation unit enables spatially resolved capacitive touch detection.

17. The assembly method according to claim 11, wherein the planar light guides are spaced apart in an air gap.

* * * * *